United States Patent [19]
Hopkins, Jr. et al.

[11] 3,926,700
[45] Dec. 16, 1975

[54] CELLULAR-URETHANE BACKED CARPET

[75] Inventors: Henry S. Hopkins, Jr., Ashland, Ohio; Philip L. Gordon, Lexington, Mass.

[73] Assignee: General Latex and Chemical Corporation, Cambridge, Mass.

[22] Filed: Apr. 13, 1973

[21] Appl. No.: 350,694

Related U.S. Application Data

[60] Division of Ser. No. 163,017, July 15, 1971, abandoned, which is a continuation of Ser. No. 878,330, Nov. 20, 1969, abandoned.

[52] U.S. Cl. ............... 428/95; 156/72; 156/148; 156/247; 260/2.5 AF; 260/2.5 AK; 264/50; 428/96; 428/311; 428/314; 428/425
[51] Int. Cl.² ............... B32B 5/18; D04H 11/00
[58] Field of Search ...... 156/72, 148, 247; 161/159, 161/160, 161, 190, 406, 66, 67; 260/2.5 AK, 2.5 AF; 264/50; 428/95, 96, 311, 314, 425

[56] References Cited
UNITED STATES PATENTS

| | | | |
|---|---|---|---|
| 3,108,976 | 10/1963 | Knox | 260/2.5 AF |
| 3,227,666 | 1/1966 | Showalter | 260/2.5 AK |
| 3,264,166 | 8/1966 | Lowery | 161/159 |
| 3,519,526 | 7/1970 | Carey et al. | 161/190 X |
| 3,538,038 | 11/1970 | Blanc et al. | 260/37 N |
| 3,694,873 | 10/1972 | Crowley | 156/72 X |
| 3,772,224 | 11/1973 | Marlin et al. | 161/190 X |

FOREIGN PATENTS OR APPLICATIONS

| | | | |
|---|---|---|---|
| 707,380 | 4/1965 | Canada | 260/2.5 AF |
| 707,381 | 4/1965 | Canada | 260/2.5 AF |

OTHER PUBLICATIONS

*Polyurethanes Chemistry and Technology;* Saunders and Frisch, Interscience Publishers, 1964.
*Foam Bulletin,* Knox, DuPont, 1960.

Primary Examiner—Daniel J. Fritsch
Attorney, Agent, or Firm—Richard P. Crowley

[57] ABSTRACT

A sheet material which comprises in combination: a backing sheet and a layer of a cured, flexible, elastomeric, cellular-urethane resin securely and directly bonded to one surface of the backing sheet, the urethane resin containing in combination a silicone fluid surfactant in an amount to aid in uniform cell structure, a catalyst to control the rate of cure, and from about 0.1 to 5.0 percent by weight of a moisture-scavenging agent, the cellular layer characterized by being composed of essentially uniform, open and interconnecting cells, and the exposed foam surface characterized by a smooth thin skin resin layer substantially free of craters, pimples and ridges therein.

17 Claims, 3 Drawing Figures

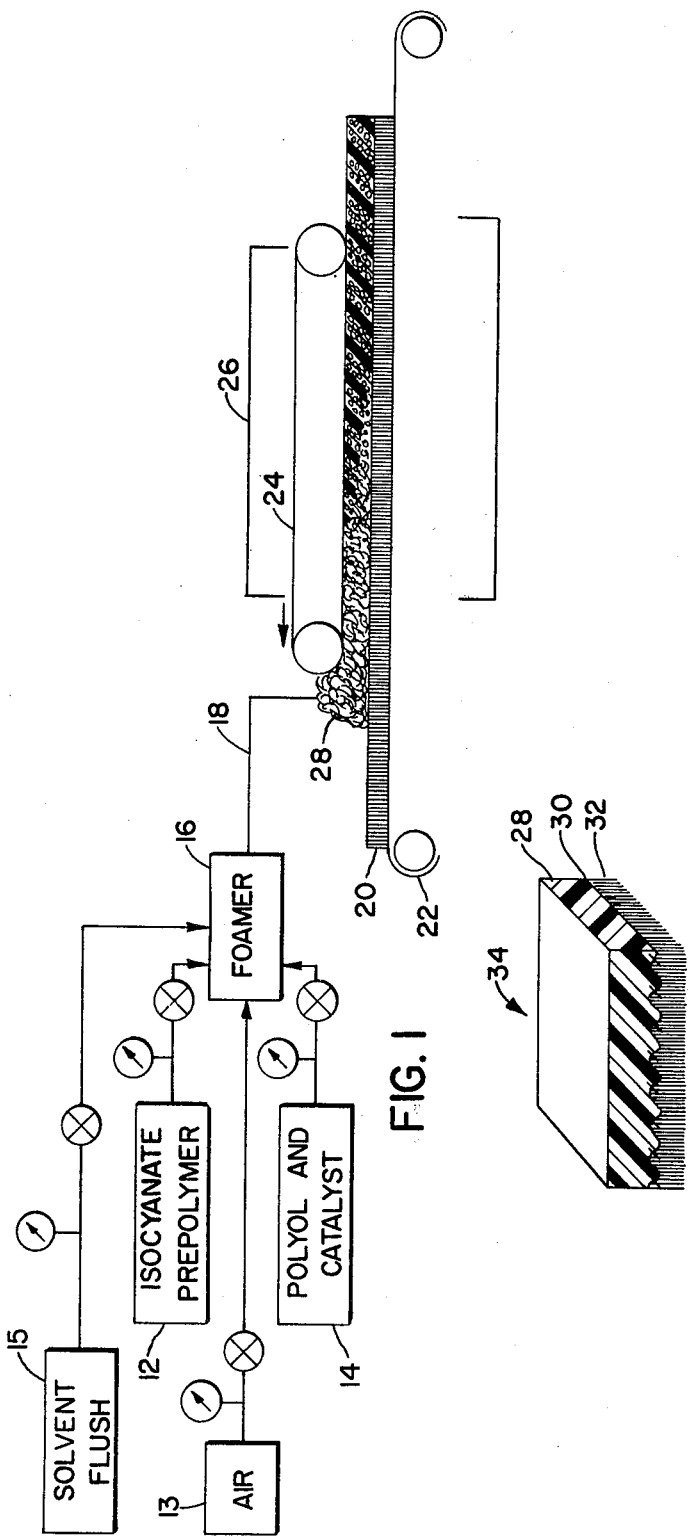
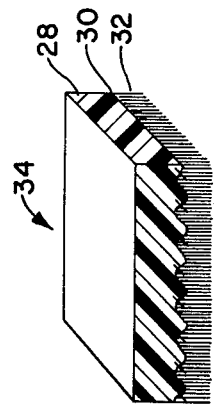
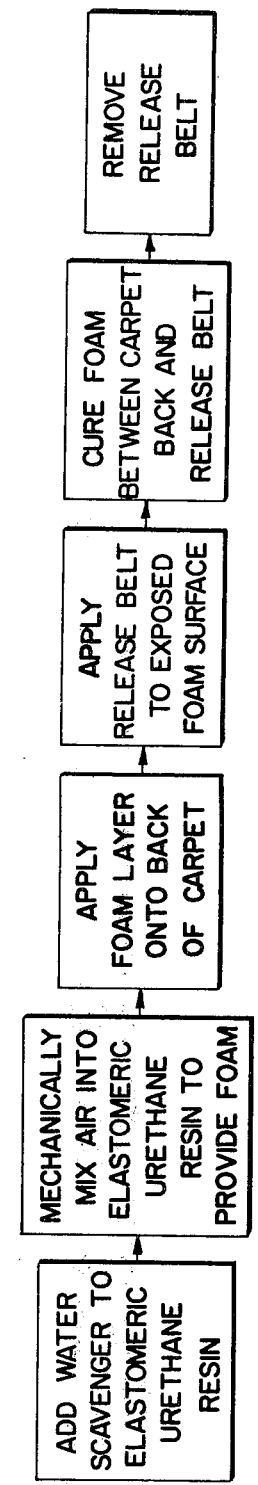

CELLULAR-URETHANE BACKED CARPET

This is a division, of application Ser. No. 163,017, filed July 15, 1971 (now abandoned), which application is a continuation of U.S. Ser. No. 878,330, filed Nov. 20, 1969 (now abandoned).

BACKGROUND OF THE INVENTION

There are many types of urethane resins, some of which like resilient elastomeric urethane resins are used primarily as coatings and as solid casting resins, while others produce a flexible or rigid urethane foam.

The usual urethane foam systems are typically dependent upon the introduction of: (1) decomposable chemical blowing agents; or (2) the reactivity of compounds containing hydroxyl groups such as water with excess isocyanates to form a carbon dioxide gas as a foaming agent; or (3) the volatilization of low boiling liquids such as fluorocarbons or combinations of these techniques.

In the production of porous and homogenous urethane resins of rigid or flexible properties, there has been certain difficulties associated with the use of such foam resin systems either of single component or two-component systems due in part to the great expansion of the resin foam system after mixing or reaction. Typical urethane resin systems encompass free water or hydroxyl groups which on reaction with excess polyisocyanates produce a carbon dioxide gas in situ which provides for the internal expansion of the resin system into a cellular structure. It has been proven in practice to be difficult to control the thickness and density of said foam systems when applied directly to the back of carpets.

Various techniques have been employed to coat the usual urethane foams onto back surfaces of carpets and into other sheet materials such as described in particular in U.S. patent 2,957,207 to Roop et al. However, there are difficulties associated with these techniques. One difficulty resides in the fluid nature of the urethane material being applied, since there is a natural tendency to strike through the carpet and to wet the fibers excessively which results in using excess material and/or stiffen the material excessively or in the extreme cases, having the fluid material strike through to the face of the carpet or coated fabric. In addition, in the Roop et al technique where the foam material while still expanding is confined between cover sheets, such confined post expansion increases the possibility of strike through to the face surface.

In certain urethane resin foam systems, it has been proposed that air be employed as a supplemental means of preparing a foam mixture such as set forth more particularly by U.S. Pat. No. 3,188,296, issued June 8, 1965 to P. Hoppe et al. In such patent, air or another inert gas is introduced into a polyester or polyether urethane expandable resin system to obtain a urethane foam. However, with such foams, it is difficult to control the density and depth of the foam, while the exposed foam surface often contains a skin with irregular and large craters or pimples. Accordingly, there exists a need for a low-cost efficient direct urethane resin foam system which does not have post expansion defects and other difficulties set forth and which foam may be directly applicable to the back of a carpet for bonding purposes and further, provide a more acceptable foam surface.

SUMMARY OF THE INVENTION

Our invention relates to the preparation of elastomeric urethane resin foams, to cellular products such as cellular backed carpets prepared by the use of said foams, and to the methods of preparing said foams and products. In particular, our invention concerns urethane resin foams prepared by mechanically beating air or other inert gas into a liquid elastomeric urethane resin wherein, for example, the resin employed is a substantially anhydrous liquid elastomeric urethane resin or wherein the liquid urethane resin has been treated or contains additives such as moisture scavengers. Such additives are employed to avoid or prevent any substantial uncontrolled post generation of a gas like carbon dioxide due to the reaction of moisture with an isocyanate in the liquid resin.

We have found that mechanical enfrothing of a liquid elastomeric urethane resin system, i.e., a normally non-gas-expandable system such as a two-component system provides better control over the forming of a foam layer and further, provides an improved method when applied directly to the back of a carpet or other sheet backing material to which the foam is to be directly bonded. Our method avoids many of the difficulties associated with the use of typical gas-expandable liquid urethane resins such as the particular problem associated with the continued uncontrolled post expansion of the urethane foams after reaction of the component and before and during the curing process.

Our invention is particularly useful in the preparation of the urethane cellular products such as, for example, an opencell urethane-cellular backed tufted, needle-punched, or woven carpets and rugs or in the preparation of a cellular backed fabric for use in garment interliners or supports or the formation of single or multiple sandwich-type cellular products wherein a cellular foam is placed between layers of sheet material.

Our elastomeric urethane foam may be usefully employed in the same manner and for the same purposes and with the same products as regular urethane foam while providing the advantages of cost. and density and depth, and surface control and other advantages herein set forth.

We have also found that our urethane resin foam and the cellular-urethane products prepared therefrom which have an exposed foam surface may be prepared with a surface which is uniform and regular and substantially without craters or pimples associated with the usual nonelastomeric urethane resins. Such foam surfaces may be prepared by contacting one or both exposed stable foam layer surfaces with a release surface or sheet after mixing of the gas but prior to substantially curing and maintaining said release surface in contact with the foam surface until the foam resin is cured. We have discovered that by enclosing a foam layer between the release surfaces or by employing at least one release surface in contact with the wet foam surface that difficulties associated with the skin surface of gas-expandable-type liquid urethane resins are inhibited or avoided. Without a release surface, a gas-expandable flexible urethane resin continues to expand after its mixing and during its gelling period. The exposed foam surface is then often characterized by large irregular surface pimples, or craters or open-cell structure unpleasing in esthetic design. Where a release surface is employed, the surface after curing is characterized by an essentially regular and uniformly smooth thin resin skin layer with the foam layer comprising small uniform cells or pores.

In preparing cellular backed products, our foam may be applied directly to the surface of the product to be coated and then a release surface such as sheet material is directly placed on the wet exposed foam layer prior to curing. Dur to the nature of the system, there will be no substantial post in situ gas-expansion after the foaming and coating. A cellular backed urethane product is thus produced of controlled thickness and desired density and with an exposed foam surface, if desired, of good quality with the opposite surface securely bonded directly to the backing sheet or back surface of the carpet.

Where one release surface is used or two, one on each surface of the foam layer, the need of controlling the amount of free water or the moisture present in the elastomeric resin while important is somewhat diminished. Where the depth or height of the elastomeric foam layer is provided solely by means to create a particular foam depth immediately after placing the foam on the surface, e.g., a doctor bar blade, roller or the like, then post expansion must be avoided by the use of a substantially anhydrous urethane elastomeric resin. Where a release surface is used, the tolerance for moisture can be somewhat increased without the effects of ridges, ripples or the like on the foam surface, but the amount of such moisture cannot be large or uncontrolled. Of course the use of our substantially anhydrous resins is preferred in both methods. For the purpose of our invention, a release surface is defined as any surface placed in contact with the wet elastomeric resin foam surface prior to curing and which can be removed after curing without damage or disruption to the foam surface. Such surfaces may include but not be limited to those continuous conveyor belts or to sheet materials which may or may not be removed after curing of the foam. For example, such surfaces includes sheet material, such a polymeric sheet material like olefinic resin sheets like polypropylene or polyethylene on coated paper or fabric sheet material which is left in contact and used is the product itself. A typical example is the use of sheet materials as release surfaces of our cellular backed carpets where the sheet material is left in place to form a cellular sandwich to be laid with the carpet or on the floor, not removed until the carpet is laid in place; e.g., used to pretect the cellular backing until installation or to aid installation or not even removed on installation.

Our invention will be described and illustrated in particular by the preparation of a cellular backed elastomeric urethane tufted carpet in which a normally nonfoamed substantially anhydrous liquid elastomeric urethane resin is employed. The resin is mechanically frothed with air in a foamer or mixer such as an Oakes mixer to form a foam. The elastomeric urethane resin system illustrated is a multi-component system and in the process described shall be a two-part system with one component containing a diisocyanate like toluene diisocyanate and the other component containing a polyol for reaction with the diisocyanate, a catalyst to control the rate of cure, a surfactant to aid in uniform cell structure, and an additive to tie up any moisture in the system. The mixer employed incorporates and provides for the controlled mixing of the two components such a number of concentric or side-side nozzles in a mixing head and may also have an additional feed stream in the mixing head so that the prepolymer mixture and the resin component mixture may be introduced substantially simultaneously. The gas such as air is introduced usually under a pressure of 0 to 100 psig.

In one method, the air-foam mixture is pumped through a tube, e.g., a flexible hose and discharged directly onto a back surface of a tufted carpet. The froth mixture may have an original heating density as desired from the foamer, such at approximately 20 to 40, e.g., 20 to 25 lbs. per cubic foot, which provides a final density of about 15–20 lbs. per cubic foot on the final carpet backing, the reduction in density due primarily to Boyle's Law. The froth material is applied to the back of a carpet and a spacing means such as a roller or doctor knife or continuous conveyor belt employed to give a controlled thickness to the froth which thickness is not substantially subsequently expanded.

A continuous conveyor belt having a polished surface may be laid directly on top of the froth and the inlet of the conveyor belt used as a spacing means to control the foam thickness. If desired a release surface such as a sheet or conveyor belt or other material presenting a surface with a low coefficient of friction between the material and the surface of the urethane foam is employed. While the enfrothed elastomeric urethane resin is enclosed between the release surface and the back of the carpet, the resin is cured and the release surface removed to provide a cellular backed urethane carpet material.

Where desired, the use of a release surface may be dispensed within the practice of our invention. In such cases, a spacing-means-like a bar or a doctor knife is employed to insure that the foam layer formed is of the correct and desired thickness, while in addition, care must be taken to insure that in situ gas generation is not accomplished, such as by moisture in the environment, which would expand the thickness of the foam after enclosing the foam surfaces. However, the use of additional moisture scavenger agents or additives will avoid problems due to environmental moisture. The use of small controlled amounts of a liquid or solid blowing agent in the elastomeric liquid resin such as fluorocarbon like Freon or heat decomposable agents may be used to supplement our enfrothing techniques.

DESCRIPTION OF THE DRAWINGS

FIG. 1 is an enlarged partially schematic and partially illustrative description of the process of preparing a cellular backed tufted carpet employing our method.

FIG. 2 is an enlarged fragmentary schematic partially isometric view of a carpet produced by our method.

FIG. 3 is a block flow diagram setting forth the steps of one preferred method of preparing a cellular backed carpet.

DESCRIPTION OF THE EMBODIMENTS OF OUR INVENTION

Our method will be illustrated in the continuous preparation of an open-cell elastomeric urethane-cellular carpet in which the cellular urethane coating will also provide direct bonding of the carpet tufts to the base fabric layer.

FIG. 1 illustrates the process of our invention wherein a prepolymer 12 composed of a diisocyanate together with a component 14 composed of a polyol and a catalyst as part of a two-component elastomeric urethane resin mixture is introduced into a foamer 16 such as Oakes foamer wherein the prepolymer and the resin component are simultaneously mixed together and wherein moisturefree air from source 13 is introduced and mechanically beaten into the reaction mixture to provide an air-urethane froth of about 20 to 25 lbs. per cubic foot density. The froth mixture 28 is pumped through a flexible hose 18 into the back surface of a tufted carpet 20 which carpet is on a moving conveyor belt 22.

A solvent flush 25 system is shown to provide for the cleaning of the foamer 16 during shutdowns. Typically, a solvent like a halocarbon such as methylene chloride, perchlorethylene, or acetone is used to dissolve and flush out remaining reaction components periodically or at the end of operations. The solvent flush is then followed by an air purge from air source 13 to dry the internal parts of the former and remove solvent vapors.

A typical two-component elastomeric urethane resin system used it as follows:

Typical Elastomoric Urethane Resin Formulation

| INGREDIENTS | PARTS BY WEIGHT |
|---|---|
| A. Prepolymer composition | |
| 1. Toluene diisocyanate adduct of dipropylene glycol | 17.24 |
| B. Polyol composition | |
| 1. P2301 VORANOL[a] an ethyleneoxide-propylene oxide diol molecular weight about 2300 | 48.27 |
| 2. Dipropylene Glycol | 5.30 |
| 3. Filler and pigment, e.g., carbon black, clay | 20.10 |
| 4. Organo metallic catalyst like: phenyl mercuric acetate 40% lead acetate | 0.20 |
| 5. Moisture scavenger like Linde[b] 4A molecular sieves | 1.00 |
| 6. Surfactant like silicone fluid DC No. 193[c] | 1.00 |

(a) a trademark of the Dow Chemical Company
(b) made by the Linde Division of Union Carbide Corp.
(c) made by Dow-Corning Co.

The pot life of this formulation is about 6 to 7 minutes.

The carpet 20 is moved forward on a conveyor 22 in combination with a continuously rotating conveyor belt 24 having a surface coating of a fluorocarbon resin like Teflon. The space between the belt surface and the carpet back serves as a spacing means to provide a controlled thickness to the urethane resin froth layer, while the belt surface serves as a release surface laid on top of the wet froth surface as the carpet is moved under the belt. The carpet 20 containing the cellular foam layer 28 is moved and encased between the conveyor belt 22 and the conveyor belt 24 through one or more ovens or heaters 26 wherein the enclosed foam is gelled and cured, e.g., at temperatures of 250° F to 400° F., e.g., 225° to 275° F. In some situations, little or no beating may be required to cure the resin, since the exothermic heat of reaction of the components may be sufficient to wholly or partially cure the resin. After curing, the release belt 24 is continuously and progressively removed or stripped from the top foam surface. This method provides a cellular backed carpet characterized by having a smooth skin furface. The urethane resin cellular foam is securely embedded into and bonded to the back of the carpet to provide excellent bonding for the tufts in the base fabric. The cellular urethane foam is substantially open-cell or breathable and composed of 50% or more of open interconnecting uniform cells, e.g., over 80 or 90%.

FIG. 2 is a partially isomeric schematic illustration of the carpet as produced by the method of FIG. 1 wherein the carpet comprises a scrim or woven fabric backing sheet 30 to which a plurality of tufts 32 have been secured therethrough (or wherein a non-woven fiber has been secured by needle punching through the backing fabric 30) and the elastomeric urethane cellular layer 28 coated on the back thereof with the exposed face of the layer 34 characterized by having a smooth surface free of craters or pimples with the cellular material compound of a plurality of small essentially uniform open cells. The product produced contains a cellular foam backing which meets or exceeds industrial standards for compression set, i.e., a maximum 15% loss by ASTM D1055 and D1056.

FIG. 3 is a block flow diagram of one method of producing a cellular backed carpet as shown in FIGS. 1 and 2 wherein air is mechanically mixed or whipped at atmospheric pressure or above, e.g., 25 to 50 psig into a nonaqueous liquid elastomeric urethane resin system to provide a urethane foam. The mechanically mixed foam is then coated onto the back of a carpet and a release sheet applied to the exposed foam surface. The foam is then cured while it is retained between the carpet back and the release belt and subsequently the release belt is removed and the cellular backed urethane product recovered.

In the process described, the foam urethane resin layer was deposited on the back of a tufted carpet; however, it is recognized that our method may also be employed wherein the foam layer is deposited on a sheet material such as a release sheet material of a conveyor belt or other surface and the back of the carpet contacted with and positioned on top of the air-enfrothed urethane resin layer.

The release surface of our invention may comprise a separate sheet of material or a continuous belt or the like. The release sheet material may have a relatively smooth finish such as a mirror finish on the foam contact surface thereof where a smooth foam surface is desired, or it may have a particular design imparted thereon in order to impart that design to the desired depth onto the urethane foam layer prior to curing. For example, a design such as a rectangular or square grid, V-type or a diamond pattern design may be used to impart a degree of skid resistance or design features to the cellular backed urethane carpet. For example, a smooth steel conveyor belt may be used for the first part of the gelling stage and a surface belt with a surface design used to emboss a design into the impressionable foam prior to curing. Release surfaces having designs thereon may be used where the foam surface is to be used in clothing or where necessary to cover defects in the skin surface.

Further, while only a single conveyor is shown a plurality of sequential belts or sheets may be used as desired at different stages such as during the forming, gelling and curing stages. The release surface may be composed of a material which is nonhydrophobic or a material which has a very low coefficient of friction in regard to the particular elastomeric urethane resin foam system employed to enabled the easy removal from the foam surface. Typical release surfaces include sheet materials or belt materials, for example, those steel or fabric belts in which a thin coating or impregnation of a polymeric material is employed such as a $C_2$–$C_4$ olefinic resin like polyethylene or polypropylene or copolymers of ethylene and propylene and the like, silicone resins or a fluorocarbon such as Teflon, or other polymers such as polyamide like Nylon, or other nonsticking polymer materials as well as belts composed of such polymers. Sheet materials useful include the use of woven and nonwoven sheet materials such as paper or fabrics having a coating thereon, for example, wax-coated or oil-coated paper or other coated paper, fabric or metal materials. Other sheet materials include metal such as stainless steel sheets or belts, glass sheets and polymeric sheets such as those polymers described in sheet form.

Our method has been described particularly concerning the use of air providing the enfrothed liquid urethane resin foam; however, it's also recognized that a variety of other inert gaseous substances may be employed to provide a foam mixture. Other materials which may be employed as the gas include nitrogen, carbon dioxide, hydrogen, natural gases such as methane, ethane, propane, butane and the like as well as gaseous halocarbons such as those fluoro and chloro halocarbons and hydrocarbons like difluoro dichloro methane and other chlorine and fluorine substances or derivatives of methane and ethane.

A variety of means may be employed to whip or mechanically beat the gas in the liquid elastomeric urethane resin either under pressure or at substantially atmospheric pressure. Where desired, supplemental gas evolving or generating agents may be used in controlled amounts such as the use of minor amounts of liquid halocarbons like Freons or heat-decomposable chemical blowing agents. It is often desirable to control the moisture content of the gas used and/or the mixing and process environment to avoid excess moisture in the resin: however, the use of excess scavenger additives is usually a more effective means of preventing post expansion.

The average cell size and the uniformity of the cells may be controlled by the viscosity of the liquid elastomeric resin system used, which liquid resin should be adjusted as desired to obtain the cell size and foam mixture viscosity and density. The viscosity will also have an effect on time and method of beating in the gas. Typically with higher viscosities, the beating action must be vigorous and small-size cells are produced, while linear viscosities often produce larger cells. To produce fine-size and regular cells, nucleating agents may be added prior to the gas whipping such as from 0.05 to 1.0% by weight of finely divided silicas like CAB—O—SIL. Other additives employed to aid in preparing a stable foam mixture include microspheric particles typically hollow such as glass microspheres or solid, hollow or cellular phenolic or plastic microspheres or particles, e.g., MICROBALLONS having an average diameter of about 10 to 250 microns. Such additives may be used in amounts of from 0.5 to 5% by weight of the liquid resin mixture.

Our method has been described in connection with the preparation of a cellular backed urethane rug; however, it is often desirable to form the urethane foam layer per se in which event the air-enfrothed liquid urethane foam mixture may be enclosed between release surfaces such as two steel conveyor belts or two release sheets, one or each may have a design on its surface to provide a foam layer of controlled thickness in which event after gelling and curing both may be removed to provide the foam layer or retained and the sandwich product employed. In some cases, the release surface may be a sheet material held against the foam where a sandwich structure is desired. One such sandwich would include a carpet, a foam layer, and sheet material such as sheet of polyethylane or a polyethylene or other polymer-coated paper. The retention of this sheet material would reduce friction on installation or handling the carpet, e.g., on unrolling or enabling easier placement of a carpet in an automobile.

Our method has been described in particular connection with the preparation of a carpet; however, it is recognized that one or even both surfaces of the air-enfrothed liquid elastomeric urethane resin layer may be contacted with and comprise a woven or nonwoven material or synthetic material such as a woven fabric material such as a knitted material having stretch characteristics in one or a number of directions, or nonwoven material or synthetic fibers or paper sheets used as the backing material or foam-coating surface.

Our method has also been described in connection with a two-component elastomeric urethane resin system wherein the components are mixed while air is beat into the mixture. However, it is recognized that a single component system as well as multicomponent system may be similarly employed. In addition, our method has been described in connection with using the inlet of the release belt as a method of applying and doctoring off a predetermined layer of a urethane foam material. The release belt may be supplemented by or dispensed with as desired. For example, the desired thickness and density of the air-enfrothed liquid urethane system may be obtained by the use of a doctor blade, roller or spacebar. In our method, the use of a spacing means alone does not produce an irregular wavy surface on the foam, since there is no uncontrolled foam expansion as in typical urethane systems, wherein the use of a doctor knife often provides an undulating uneven exposed foam surface due to the subsequent afterblowing effects of the moisture-sensitive flexible urethane resin system.

Typically, in the gell and cure times of our urethane resin systems, the gell and cure temperatures may be varied depending upon the particular urethane resin components employed and the pot life. However, it is desirous that the air and froth urethane foam mixture be encompassed between confining surfaces for a period of time sufficient to insure the cure of the material typically at temperatures of from about 250° F to 350° F from a time period of one to ten minutes, unless the cure is accomplished at lower temperatures or by exothermic reaction heat. It is also preferred that contact to one foam surface or both foam surfaces be made with the backing material while the urethane foam is wet, that is, in a precured contact. Our method is particularly adapted to the preparation of cellular backed indoor-outdoor carpets wherein there is an olefinic resin fiber as the face fiber. We have also found that our urethane system and method as described provides excellent direct bonding to the polyethylene or polypropylene fiber tufts.

The liquid anhydrous elastomeric urethane resins of our invention comprises those urethane resins which, when solid, are characterized by being rubbery and elastomeric in properties after gelling and/or curing. Elastomeric urethane resins are described in general in the book entitled "Polyurethanes — Chemistry and Technology" Part I, pages 11–15 by Saunders and Frisch, published by Interscience Publishers, 1962, hereby incorporated by reference.

A wide variety of liquids polyols may be employed in our formulations of either the ester or ether type having hydroxyl numbers ranging from 1,000 to 25: for example, 800—50. A mixture of polyols may be employed such as a mixture of a short-chain and a long-chain polyol to provide the desirable properties for our elastomeric urethane formulations. The polyol should be selected so as to provide an ultimate formulation which is not excessively rigid. Useful polyglycols may be of esters or ethers; for example, the esters may be the reaction products of a poly basic acid and an alcohol such as a dibasic acid like adipic acid and an alcohol such as propylene glycol. The polyglycol ethers may be formed as adducts of ethylene oxide or propylene oxide or mixtures thereof with polyhydroxy compounds such as glycerin trimethylol propane and the like.

A variety of polyisocyanates may be used in our elastomeric resins to include aryl, aliphatic and polymeric diisocyanates and such as toluene diisocyanate, polyarylpolyisocyanate and the like. Suitable catalysts which may be employd include aliphatic amines such as the alkyl and alkylene amines, more particularly tertiary amines like triethylene diamine, triethyl diamine, dimethyl amine, ethylene diamine and the like, although amines are not the preferred catalysts since they often tend to promote blowing. Preferred catalysts would include organo metallic catalysts or organic salts such metals including mercury, lead, tin, nickel, iron; for example, acetates, octoates, tallates and the like like dibutyl tin diacetate.

Our elastomeric resin formulations may include fillers, pigments, dyes, thickeners, stabilizers, surfactants, dispersing aids and other additives conventionally employed in urethane resins to include but not be limited to mineral fillers and pigments in amounts desired; for example, of from 0.1 to 25 percent by weight, e.g., 1.0 to 5%. Typical specific additives include carbon black, titanium dioxide, calcium carbonate, magnesium oxide, silica, diatomaceous earth, calcium oxide, barium sulfate and the like.

Moisture scavenger agents may be included in our elastomeric urethane resins to control undesired blowing in situ. The scavenger agents should be employed in such amounts to remove free water or moisture in the reaction mixture from entering into a reaction with excess polyisocyanates present. Further, slight additional or excess amounts are often employed to prevent moisture in the gas used to prepare the froth mixtures or from the environment from generating carbon dioxide. The amount of the agent is controlled by the moisture in the components, a large amount of which is introduced by the pigments and fillers used. Typical amounts should be used to make the resin wholly or substantially anhydrous i.e., to insure that no substantial expansion in the air-foam layer occurs by post expansion by in situ generation of carbon dioxide. Typical amounts used may vary from 5 to 0.1 percent by weight, e.g., 2.0 to 0.5% when the moisture in the resin system is 0.05% or less. It is often easier to employ scavenger agents than attempt to dry the components used or protect the environment.

Suitable scavenger agents include both liquid and solid material which is dispersed or soluble in the resin system. Such materials may scavenge moisture by chemical means through reaction with the water or chemical bonding or by physical absorption or adsorption or by cholation, complexing or the like wherein the moisture is prevented from preferentially reacting with the polyisocyanate.

A particularly useful class of scavenger additives in our resin formulations include molecular sieve particles such as dehydrated molecular sieve particles. Molecular sieves may comprise those ammonium and alkali and alkaline earth metal salts of aluminosilicates such as the sodium and calcium molecular sieves known as 4A, 5A, etc.. Other scavenger agents include calcium hydride and the like.

Having thus described our invention, what we claim is:

1. A sheet material which comprises in combination: a fibrous backing sheet and a layer of a cured, flexible, elastomeric, cellular urethane resin securely and directly bonded to the fibers on one surface of the backing sheet, the urethane resin containing in combination:
   a. a silicone fluid surfactant in an amount to aid in uniform cell structure;
   b. a catalyst to control the rate of cure; and
   c. from about 0.1 to 5.0 percent by weight of a moisture-scavenging agent, the cellular layer characterized by being composed of essentially uniform, open and interconnecting cells, the exposed foam surface characterized by a smooth thin skin resin layer substantially free of craters, pimples and ridges therein.

2. The material of claim 1 wherein the moisture-scavenging agent comprises molecular sieve particles.

3. The material of claim 1 wherein the resin contains from about 0.5 to 2.0 percent by weight of the moisturescavenging agent.

4. The material of claim 1 wherein the moisture-scavenging agent comprises a 4A or 5A molecular sieve material.

5. The material of claim 1 which includes a release sheet material in contact with the exposed surface of the cellular layer, the surface of the release sheet material contacting the cellular layer having surface characteristics which enable the release sheet to be easily removed from the cellular surface.

6. The material of claim 5 wherein the release sheet material is a polymer-coated paper sheet or a sheet of a $C_2$–$C_4$ olefinic resin.

7. The material of claim 1 wherein the resin contains from about 0.05 to 1.0 percent by weight of a nucleating agent to provide regular and fine-size cells.

8. The material of claim 1 wherein the backing sheet material is a fabric sheet material.

9. The material of claim 1 wherein the cellular layer is composed of over 90 percent open, interconnecting cells.

10. The material of claim 1 wherein the urethane resin includes from about 1.0 to 5.0 percent by weight of a silicone fluid surfactant.

11. The material of claim 1 wherein the backing sheet comprises a scrim sheet having a face surface composed of a plurality of tufted fibers, the fibers secured to the scrim sheet and the urethane layer bonded directly to the back surface of the scrim sheet and to the back of the tufted fibers on such surface.

12. The material of claim 11 wherein the tufted fibers are composed of olefinic resin fibers.

13. The material of claim 1 wherein the cellular foam layer meets or exceeds a maximum of 15% loss in compression set when measured by ASTM D1055 and 1056.

14. The material of claim 1 wherein the resin includes from about 0.05 to 1.0 percent by weight of finely divided silica.

15. The material of claim 1 wherein the elastomeric urethane resin is a reaction product of a diisocyanate and a liquid polyol having a hydroxyl number of from about 25 to 1000, the cured elastomer characterized when cured by being rubbery and elastomeric in properties.

16. A tufted carpet, which carpet comprises in combination:

a scrim sheet material, fibers secured through the scrim sheet material to form a fibrous face surface on the scrim sheet material, and an exposed back surface of such fibers and a layer of a cured flexible elastomeric cellular urethane resin securely and directly bonded to the back surface of the scrim sheet material and the fibers on such back surface, the urethane resin containing in combination:

a. a silicone fluid surfactant in an amount to aid in uniform cell structure;
b. a catalyst to control the rate of cure; and
c. from about 0.1 to 5.0 percent by weight of molecular sieve particles therein as a moisture-scavenging agent, the moisture content of the resin less than 0.05% moisture, the cellular layer characterized by being composed of essentially uniform, open and interconnecting cells.

17. The carpet of claim 16 wherein the fibers are composed of polyethylene or polypropylene fibers.

* * * * *